United States Patent [19]

Kennedy, Jr.

[11] 4,094,479
[45] June 13, 1978

[54] SIDE SLIP ANGLE COMMAND SCAS FOR AIRCRAFT

[75] Inventor: Thomas W. Kennedy, Jr., Phoenix, Ariz.

[73] Assignee: Sperry Rand Corporation, New York, N.Y.

[21] Appl. No.: 781,226

[22] Filed: Mar. 25, 1977

Related U.S. Application Data

[63] Continuation of Ser. No. 653,555, Jan. 29, 1976, abandoned.

[51] Int. Cl.² .............................................. G05D 1/10
[52] U.S. Cl. .................................... 244/179; 244/184; 318/586
[58] Field of Search ............... 235/150.2, 150.22; 244/17.13, 177, 178, 179, 184, 185, 189, 196, 197; 318/586

[56] References Cited

U.S. PATENT DOCUMENTS

| | | |
|---|---|---|
| 2,827,250 | 3/1958 | Rusler, Jr. ............................ 244/179 |
| 3,386,689 | 6/1968 | Parker et al. ......................... 244/197 |
| 3,404,856 | 10/1968 | Gerstine .............................. 244/177 |

*Primary Examiner*—Stephen G. Kunin
*Attorney, Agent, or Firm*—Howard P. Terry; Albert B. Cooper

[57] ABSTRACT

A yaw axis stability and command augmentation system (SCAS) particularly applicable to STOL type aircraft includes three primary control terms proportional to side slip angle, side slip angle rate and rudder pedal force, wherein side slip angle rate is synthesized from measures of yaw rate, bank angle and lateral acceleration. These primary system feedback terms are supplied to the rudder electro-hydraulic secondary actuator which is positioned in accordance with their sum. The system serves to provide improved automatic damping of the Dutch roll modes, to suppress aircraft motion transients in yaw and roll under engine failure situations, to provide automatic turn-coordination in maneuvering flight, and to provide a side slip angle command capability to improve manual control precision in approach and landing under crosswind and lateral wind shear conditions.

8 Claims, 1 Drawing Figure

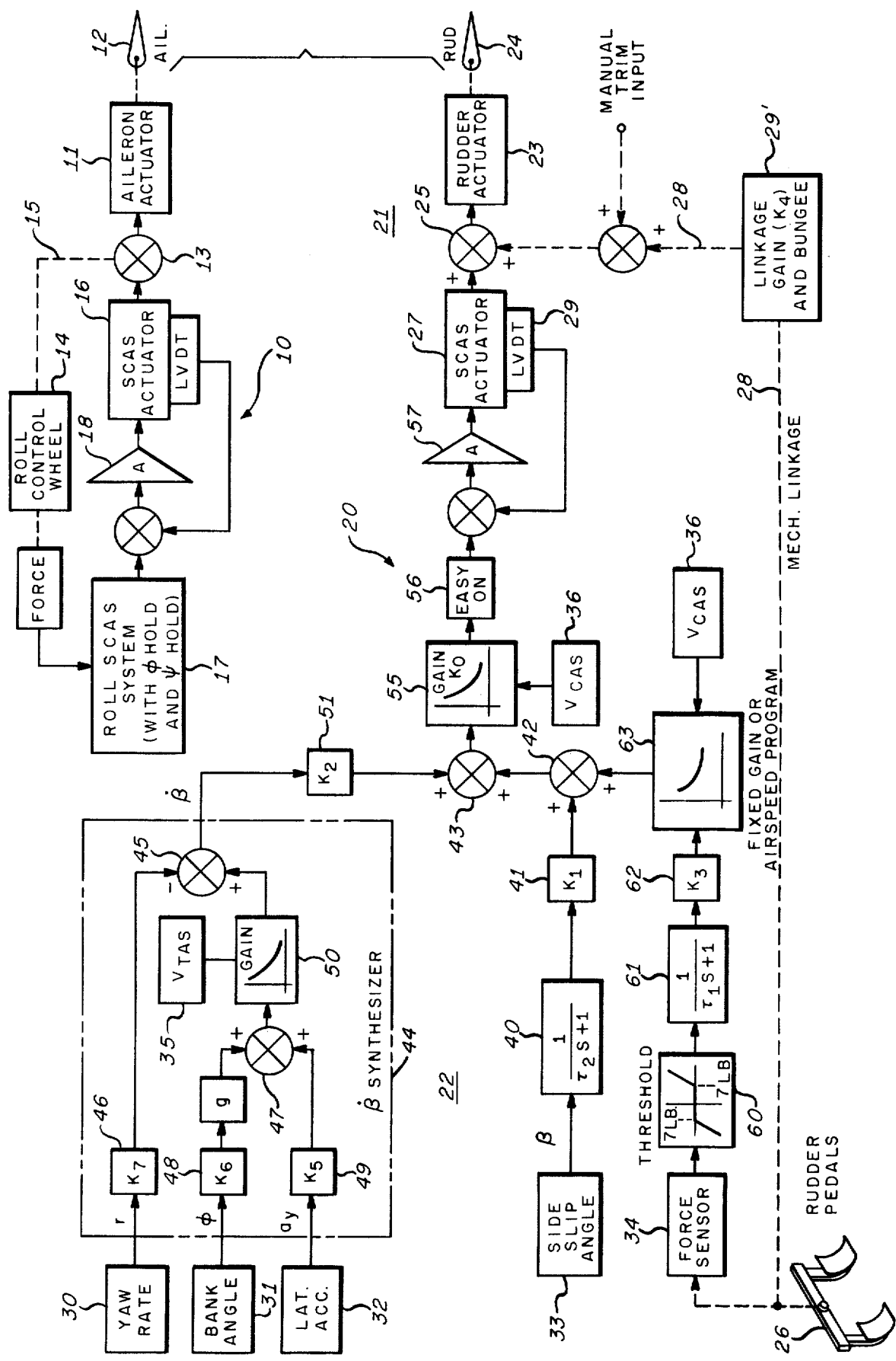

SIDE SLIP ANGLE COMMAND SCAS FOR AIRCRAFT

This is a continuation of application Ser. No. 653,555, filed Jan. 29, 1976, now abandoned.

BACKGROUND OF THE INVENTION

1. Field of the Invention

The present invention relates generally to automatic flight control systems for aircraft and more particularly to yaw damper systems. Specifically, the present invention is directed to a yaw stability and command augmentation system (SCAS) particularly applicable to, but not limited to, short takeoff and landing (STOL) aircraft of the externally blown flap type, which system substantially improves and lateral-directional stability and handling characteristic of this type aircraft. However, it will be understood that while the invention is herein described with respect to STOL type aircraft, many aspects of this basic invention may be applicable to more conventional types of aircraft so that the following specification is to be interpreted as descriptive rather than limitive.

2. Description of the Prior Art

Most conventional commercial and military high performance aircraft are equipped with some type of full-time yaw stability augmentation system (SAS), the primary function of which is to provide short term Dutch roll mode damping and in most cases, some form of turn coordination. While good performance of conventional aircraft is provided by this type of yaw SAS, it has been found not to be entirely satisfactory for the wide range of dynamic flight characteristics of STOL type of aircraft, especially in the low speed/high lift configuration required in the take-off and landing modes of operation thereof. Some of the dynamic control complications in these modes are produced by the decreased inherent yaw/roll stability of the aircraft and severe aerodynamic yaw/roll cross coupling moments. These characteristics of STOL type aircraft (and also of some more conventional type aircraft not specifically designated as a STOL type) complicate the automatic control of the dynamic modes associated with Dutch roll damping, engine out or engine failure, turn coordination, turbulence, and crosswinds. The Yaw SCAS of the present invention significantly improves the automatic control and manual handling qualities of STOL type aircraft particularly in its low speed flight regimes.

SUMMARY OF THE INVENTION

The Yaw SCAS of the present invention utilizes as its basic control terms signals proportional to side slip angle, side slip angle rate and rudder pedal force. These signals are scaled, algebraically summed, gain programmed as a function of calibrated airspeed, amplified and supplied to the rudder series actuator; a series actuator position signal fed back to the amplifier input assures accurate positioning of the series actuator in accordance with its electrical input. The output of the series actuator is mechanically summed with a direct mechanical pilot input from the rudder pedals, the resultant mechanical motion correspondingly positioning the rudder through the rudder primary actuator. In the illustrated embodiment the side slip angle signal $\beta$ is provided by means of a vane or probe, while the side slip angle rate signal $\dot{\beta}$ is synthesized from signals proportional to yaw rate, bank angle and lateral acceleration. The rudder pedal force signal is provided by a force sensor mechanically coupled with the rudder pedal mechanism which in the illustrated embodiment is directly connected mechanically with the rudder actuator. The $\beta + \dot{\beta}$ feedback terms in the system provides greatly improved turn entry and turn exit and steadly state turn coordination, more flexible means for damping the Dutch roll characteristics of the aircraft, improved engine out control and improved manual handling of the aircraft. In effect, the $\beta$ term significantly augments the basic directional stability derivative of the aircraft. It also significantly reduces yaw excursions associated with a failed engine and as a result also reduces bank angle excursion under such conditions due to inherent yaw/roll aerodynamic coupling, (e.g., dihedral effects). At low airspeeds, particularly very low airspeeds of STOL type aircraft, considerable pilot rudder effort is required to coordinate turns due primarily to the reduced directional stability at low airspeeds which result in large side slip angles. The $\beta$ SCAS system of the present invention greatly reduces side slip angle excursions during turn entry and turn exit and reduces the period of its occurrence. The contributions of the mechanical and electrical pedal force terms $F_{PM}$ and $F_{PE}$ in the $\beta + \dot{\beta}$ system significantly improves the manual handling qualities of the STOL aircraft, particularly in performing maneuvers in the low speed takeoff mode and even more significantly in the approach and landing modes under crosswind and lateral wind shear conditions. This improved manual control is due to the improved directional stability of the aircraft provided by the system and the fact that sideslip angle is maintained proportional to rudder force during a forward step maneuver, i.e., as the pilot adjusts yaw angle and bank angle to compensate for the cross winds. Rudder position is maintained by the present automatic yaw SCAS to maintain a sideslip proportional to rudder pedal force, i.e., a sideslip angle command system.

BRIEF DESCRIPTION OF THE DRAWINGS

The single FIGURE of the accompanying drawings illustrates schematically the preferred embodiment of the yaw SCAS of this present invention together with a simplified schematic of the roll SCAS for completeness.

DESCRIPTION OF THE PREFERRED EMBODIMENT

The preferred embodiment of the present invention will be discussed in connection with its application to a large wide-bodied transport STOL aircraft of the blown flap type since its advantages in this type of aircraft are readily explainable and appreciated. In its broad aspects, the invention is applicable to other types of fixed wing aircraft of the STOL as well as of the conventional type.

In blown flap types of STOL aircraft, engine thrust air is directed downwardly by large extendable flaps thereby generating forced lift in the STOL mode. The engines may be mounted on the wings so as to "blow" under the bottom of the wing or over the top of the wing; in either case, the lift-thrust effect is the same. The invention is also applicable to augmentor wing STOL aircraft in which high pressure air is generated internally of the wing and blown out through slotted downwardly extendable flaps. It will be appreciated that with this type of aircraft, lift is not fully dependent upon airspeed and hence very low take-off-and-landing speeds are achievable. For example, a large STOL aircraft having a gross weight of over 150,000 lbs. may have a landing speed of only about 85 knots with full flaps. The same aircraft may also have an approach speed of about 150 knots with partial flaps while in a "clean" configuration may have a mid range cruise speed of 250 knots and a high speed cruise range of 350 knots or more. Furthermore, it will also be recognized that in the final approach and landing configuration throttles are not retarded as in conventional aircraft but instead are advanced to provide the required lift thrust.

From the foregoing, it will be appreciated that STOL type aircraft operate over an extremely large speed range and hence present severe problems in terms of its stability and control. The inherent stability at low speeds may be increased in increasing the area of its control surfaces, e.g., rudder and stabilizer areas as well as its control surfaces, e.g., rudder, elevators, and ailerons. In some designs, dual control surfaces are used, both acting during low speed flight and but one acting in high speed flight. Many, many specific designs have been developed through the years.

There obviously is a limit to which the aircraft designer may go, however, in designing inherent stability into an aircraft. However, this limit may be greatly extended by providing artificial stability for the aircraft. This artificial stability is provided by automatic control systems which sense aircraft motions about its primary axes through motion sensors, such as rate and acceleration sensors, which automatically control the aircraft control surfaces through electromechanical or electrohydraulic actuators in a manner to suppress such motions. Such systems are known as stability augmentation systems or SAS systems. In some cases, the SAS is designed so that the human pilot may command the aircraft motions through the SAS, such systems being referred to as stability and command augmentation systems or SCAS. The present invention relates to a SCAS for the aircraft yaw axis and hence is termed a yaw SCAS.

The stability and control of a STOL transport aircraft of the blown flap type is further aggravated at the low airspeeds by the fact that such aircraft tend to be "short and fat" thereby exhibiting poor inherent directional stability, that they usually do not have swept wings, thus exhibiting a high degree of yaw/roll crosscoupling, and that since the throttles are set at high thrust at low speeds (operating on the back side of the power curve), the sudden loss of an engine produces extreme yaw transients (and attendant roll transients) and further that, in the case of an inboard engine failure, the resultant differential airflow on the fuselage side surfaces further aggravates the yawing movement. In addition, because of the low approach and landing speeds of the STOL aircraft, cross winds, relatively easily handled by aircraft with relatively high landing speeds, become a severe problem with the STOL aircraft. The yaw SCAS of the present invention is particularly useful in overcoming these unique problems of STOL aircraft.

Referring now to the single FIGURE of the drawings, there is illustrated schematically the roll and yaw SCAS for the aircraft. The roll SCAS channel 10 is illustrated in the FIGURE simply to complete the aircraft lateral stability and control system. It is assumed in the following discussion that the roll SCAS is operational and engaged in all flight modes for reasons to be explained below. The roll SCAS 10 is conventional and comprises a primary aileron actuator 11, usually hydraulic, for positioning the aileron 12 in accordance with its input. Its input is the output of a mechanical differential mechanism 13 having an input from the pilot's control wheel 14 through direct mechanical linkage 15 and the other input from a conventional, usually hydraulic, series secondary actuator, or roll SCAS actuator 16. Such series secondary actuators are well known in the art.

Series actuator 16 is positioned in accordance with electrical SCAS signals from a SCAS signal system 17 through servo amplifier 18. The roll SCAS is controlled primarily by signals proportional to craft roll rate for stabilizing roll transients, roll attitude and/or heading for providing an attitude hold and/or heading hold pilot relief modes, and roll wheel force which provides a roll command or manual turn mode capability through the roll SCAS. As will be explained below, the yaw SCAS of the present invention greatly improves the turn control coordination commanded by the pilot via the roll SCAS.

The yaw SCAS channel 20 comprises generally an actuator section 21 and an electronics section 22. The actuator section 21 comprises a conventional primary rudder actuator 23 for positioning the aircraft rudder 24 in accordance with its input which, in turn, is the output of a mechanical differential mechanism 25 having as one of its inputs a direct mechanical connection from the pilot's manually actuating rudder controller, illustrated here as rudder pedals 26, while the other of its inputs is the mechanical output of a conventional, usually electrohydraulic, series secondary actuator or yaw SCAS actuator 27. It should be noted, however, that both the roll and yaw secondary actuators may be wholly electric, that is, an electric motor having a cable drum output or a linear mechanical output connected to the primary actuator differential input. The rudder pedals 26 are connected to the primary actuator input differential 25 through a conventional, usually complex system of levers, ball cranks, trim mechanism, feel springs and/or bungees which provide a predetermined mechanical gain, i.e., a predetermined rudder deflection $\delta_R$ per pound of force applied by the pilot on the pedals; all of this conventional mechanism is indicated schematically by mechanical connections 28 and linkage gain and bungee 29'.

The electronic section 22 receives input data from various data sensors and computes therefrom an electrical output signal proportional to the rudder deflection $\delta_R$ required to cause the craft to obey the predetermined SCAS control law as will be set forth below. This electrical output signal is applied to secondary actuator 27, the position of which is controlled to correspond to this signal by means of a conventional servo position feedback signal derived from a linear voltage displacement transducer (LVDT) 29.

The primary sensors used in the illustrated embodiment of the yaw SCAS of the present invention include a yaw rate sensor 30 which may, for example, by a conventional rate gyro; a bank angle sensor 31, which may be a vertical gyroscope or gyroscopic platform; a lateral acceleration sensor 32, which may be a simple pendulum or other form of linear accelerometer; a side slip angle sensor 33, which may be a wind vane or other air flow direction detector mounted on the upper or lower surface of the aircraft so as to sense any lateral component of air flow direction relative to the fuselage longitudinal centerline, or computed from on-board inertial and air data sensors; and a pedal force sensor 34 coupled with the rudder pedal mechanism 26, which sensor may be any type of strain sensor for measuring the force the pilot applies thereto. All of these foregoing sensors 30–34 include electrical transducers conventionally associated therewith for supplying electrical signals proportional in sense and magnitude to the parameter it senses and each of these sensors therefore constitute a means for supplying a signal proportional to the parameter sensed thereby. Secondary sensors embodied in the present yaw SCAS include a true airspeed sensor 35 and a calibrated airspeed sensor 36 and each provide electrical signals proportional to these parameters. Conventional aircraft air data computers routinely compute these parameters from pitotstatic probes of the air mass through which the aircraft is flying.

Before discussing the electronics section 22 of the present invention, the control law governing the system operation will be set forth. The output of the system is rudder position or deflection from its reference or trim position, which in the present discussion is assumed to be parallel to the longitudinal or x-axis of the aircraft, i.e., aerodynamic trim is assumed to be zero. Thus, the basic system control law is given by the expression:

$$\delta_R = [K_1 \beta + K_2 \dot{\beta} + K_3 F_{P_E}] \frac{K_o}{V_{CAS}} + K_4 F_{P_M} \quad (1)$$

wherein $\delta_R$ = Rudder position;
$\beta$ = Side slip angle;
$\dot{\beta}$ = Side slip angle rate;
$F_{P_E}$ = Rudder pedal force electrical signal (without $V_{CAS}$ gain schedule);
$F_{P_M}$ = Rudder pedal force mechanical signal;
$V_{CAS}$ = Calibrated air speed; $K_0$ thru $K_4$ = Gain constants. The side slip angle term $\beta$ is provided by the side slip angle sensor 33. Preferably the sensor is mounted on the upper or lower fuselage surface and aligned with the fuselage centerline and as near as possible to the aircraft c.g. to eliminate any yaw rate effects which might tend to de-stabilize the Dutch roll mode of the aircraft. The $\beta$ displacement term may also be computed from wholly inboard sensors of aircraft angular position, angular rates, linear accelerations, and angle of attack and airspeed data, obviating the need of external probes. The sideslip angle rate term $\dot{\beta}$ may be generated in a number of ways. One way is to pass the $\beta$ displacement signal through a derivative network or through a high pass or wash-out filter network. Using this technique would require that the displacement $\beta$ term be insensitive to unwanted high frequency components which might be produced by aircraft accelerations and-/or vibrations. In the illustrated embodiment of the present invention, the $\dot{\beta}$ term is computed or synthesized from the inboard sensors described above, in accordance with the following relationship:

$$\dot{\beta} = K_2(K_5 \frac{A_{y_{cg}}}{V} + K_6 \frac{g\phi}{V} - K_7 r) \quad (2)$$

where $\dot{\beta}$ = sideslip angle rate;
$A_{y_{cg}}$ = acceleration of the aircraft c.g. along the aircraft lateral or y axis;
$\phi$ = aircraft bank angle;
$r$ = rate of turn about the aircraft vertical or z axis;
$g$ = gravity acceleration constant;
$v$ = aircraft true airspeed (TAS); $K_5$ thru $K_7$ = gain constants. The synthesis of the $\dot{\beta}$ term may be simplified in some aircraft designs, including the one described above, by eliminating the lateral acceleration term. This is advantageous in many cases since accelerometer signals tend to be quite noisy, i.e., includes undesired high frequency components due to craft structural mode vibrations and the like. Thus, the $\dot{\beta}$ term is reduced to the following:

$$\dot{\beta} = K_2(K_6 \frac{g\phi}{V} - K_7 r) \quad (3)$$

where the terms are the same as in equation 2 above although $K_6$ and $K_7$ may be require slight adjustments. Thus, the control law for the yaw SCAS may be rewritten:

$$\delta_r = [K_1 \beta + K_2(K_6 \frac{g\phi}{V} - K_7 r) + K_3 F_{PE}] \frac{K_o}{V_{CAS}} + K_4 F_{PM} \quad (4)$$

where the terms are as above.

Returning now to the drawing, the sideslip angle signal from sensor 33 is passed through a smoothing filter 40, which may have a time constant of about 0.2 seconds, and a gain network 41 to a summing means or junction 42 and thence to a further summing junction 43. This jet described structure constitutes a means for supplying a signal proportional to the sideslip angle of the aircraft.

The generation of the $\dot{\beta}$ signal is accomplished by the apparatus contained within the area 44, identified as $\dot{\beta}$ synthesizer to which the yaw rate sensor 30, bank angle sensor 31 and lateral acceleration sensor 32 signals are applied. The yaw rate sensor 30 signal is applied to a summing means or junction 45 through a gain network 46. The bank angle sensor 31 signal is applied to another summing junction 47 through a gain network 48 and the lateral acceleration sensor 32 signal is passed through a gain network 49 and applied to junction 47 where it is summed with the vertical gyro roll signal. As indicated by equation 2 above, both the bank angle and lateral acceleration terms are varied as a function of true airspeed. This is accomplished by feeding the sum of these two signals, i.e., the output of junction 47 to a variable gain control circuit or means 50, the gain of which is varied in accordance with a signal from true airspeed sensor 35. The output of gain control circuit 50 is summed with the yaw rate signal in summing junction or means 45, to provide the sideslip angle rate output $\dot{\beta}$ as defined in equation 2 above. Thus, the apparatus just described constitutes a means for providing a signal in accordance with the rate of change of side slip angle of the aircraft. As discussed above, the $\dot{\beta}$ synthesis may be simplified in some applications by removing the lateral acceleration term. This may be accomplished by setting gain circuit 49 so that $K_5 = 0$ or simply by eliminating the lateral acceleration sensor entirely. Thus, the output of computer or synthesizer 44 constitutes the $\dot{\beta}$ signal of equation (1) or equation (2), which signal is applied through a gain circuit 51, as a further input to summing means or junction 43. It will be appreciated that the gains $K_5$, $K_6$ and $K_7$ may be adjusted to provide the desired gain $K_2$ of the $\dot{\beta}$ signal input to junction 43 or the independent gain circuit 51 may be included to provide additional design flexibility for the means 44 for supplying a signal in accordance with the side slip angle rate of the aircraft.

The rudder deflection effectiveness in providing a yawing moment on the aircraft is a direct function of air flow velocity over the rudder surface, i.e., the higher the airflow velocity the greater the yawing moment for a given rudder deflection. Therefore, in order to maintain rudder effectiveness substantially constant over the airspeed range of the aircraft, the rudder control signals to the secondary or SCAS actuator 27 are varied as an inverse function of craft airspeed, which in the present embodiment of the invention is calibrated airspeed. For illustrative purposes, the gain scheduling for four airspeed modes of operation are considered: Takeoff-Land, 85 kts/hr; Approach, 150 Kts/hr; Mid-Q, 240 Kts/hr; and High-Q, 336 Kts/hr, where Q is dynamic pressure. Also, in order to simplify the mechanization of this parameter control, the gains of $K_1$ and $K_2$ are so selected such that the gain ratio between $\beta$ and $\dot{\beta}$ will be essentially constant thereby permitting the use of a single variable gain element responsive to the sum of the $\beta$ and $\dot{\beta}$ signals rather than a separate variable gain element responsive to each of these signals.

Thus, referring again to the drawing, the $\beta$ and $\dot{\beta}$ signals are summed at summing junction 43 and the output thereof is applied to a variable gain circuit 55, such as a variable gain amplifier, the gain of which is controlled in accordance with a signal from calibrated airspeed sensor 36 which constitutes a means responsive to craft airspeed for providing a signal in accordance therewith. The gain control is preferably continuous over the airspeed range but may be incremental depending upon the specific application. In one STOL aircraft application, the gains $K_1$ and $K_2$ which provided substantially optimum response of the system at the airspeed modes set forth above are listed below:

| | |
|---|---|
| Land (85 kts) | $K_1 = 2.0$, $K_2 = 2.5$ |
| Approach (150 kts) | $K_1 = 1.13$, $K_2 = 1.42$ |
| Mid Q (240 kts) | $K_1 = 0.71$, $K_2 = 0.88$ |
| High Q (336 kts) | $K_1 = 0.51$, $K_2 = 0.63$ |

Thus, the gain controller 55 constitutes a means responsive to craft airspeed for varying the magnitude of the side slip angle and side slip angle rate signals in accordance with craft airspeed.

The output of the airspeed gain control element 55 is applied to an easy-on or easy-engage circuit 56 which is simply a conventional circuit having a characteristic such that when the SCAS is initially turned on, any electronic commands existing at the input to the easy-on are activated in a ramp manner which softens the response of the downstream apparatus thereto. In the present system, such downstream apparatus is the servo amplifier 57 controlling the secondary actuator or servo 27, the servo position signal from LVDT 29 being fed back to the input of amplifier 57 to assure that the servo position input to mechanical differential 25 controlling rudder actuator 23 is proportional to the $\beta$ and $\dot{\beta}$ sum signal. Thus, the above just described elements constitute a means responsive to the side slip angle and side slip angle rate signals for controlling the rudder actuator of the aircraft.

In accordance with the teachings of the present invention, a further signal is added to the system so far described, this signal being a signal which is variable in accordance with the force that the pilot applies to the rudder manual controller or rudder pedals 26. The addition of the pilot's input signal to the side slip angle and side slip angle rate signals results in a side slip angle command capability which greatly improves the manual controllability of the aircraft, particularly an aircraft of the STOL type. The rudder pedal force signal is provided by the force sensor 34 coupled with the rudder pedals 26. This signal is applied to a dead zone circuit arrangement 60 which is a circuit which provides an output proportional to rudder pedal force (calibrated in volts per pound) only when such force exceeds some predetermined threshold value, say $\pm$ 7 lbs as depicted. This dead zone circuit may be a conventional one in which the input force signal is divided into two branches with a limiter in one branch and then subtracted from the unlimited signal branch. This results in an output signal proportional to force in excess of the value of the limiter. This dead zone allows the pilot to rest his feet on the rudder pedals and make normal movements in the cockpit without inserting an unwanted force signal into the system. The mechanism 29' in the direct rudder pedal input to differential 25 usually includes a similar dead zone for the same purposes. The output of threshold circuit 60 is applied to a low pass filter circuit 61 which serves to suppress any high frequency fluctuations in the signal due to any unevenness of pressure which the pilot may inadvertently apply on the pedals. The filtered force signal is applied to a gain circuit 62 for setting the initial value of $K_3$. In some applications, the output of gain circuit 62 may be connected directly to summing junction 42 and thus is used, without further gain changing to further control the rudder actuator 23. In other applications it may be desirable to further gain control the force signal as a function of airspeed and this may be accomplished by a variable gain control circuit 63, the gain of which is varied in accordance with a signal from the CAS sensor 36. This variable gain control would be necessary particularly if basic aircraft sideslip to rudder force response characteristics varies with airspeed. In the illustrated embodiment of the invention, the pedal force signal is inserted into the system at summing junction 42 where it is summed with the sideslip angle displacement signal. Its gain is therefore varied as a function of CAS through gain control 55. Thus, the apparatus just described constitutes a means for providing a signal in accordance with the force applied by the pilot to the manual rudder controller and for further controlling the rudder actuator in accordance therewith.

The sideslip angle stability and command augmentation system of the present invention is especially effective in the following modes of operation of an aircraft, particularly a STOL type aircraft: Dutch roll damping, turn coordination, engine failure and performance in crosswinds and lateral wind shears, especially during the approach and landing modes where flight path must be precisely controlled. In the following discussion it will be assumed that the roll SCAS 10 is activated and engaged.

The herein disclosed $\beta$ SCAS system serves basically to augment the basic aircraft's directional stability derivative which is the stability derivative most closely associated with the frequency of the Dutch roll oscillation. A conventional yaw rate type damper provides only limited control of the Dutch roll mode frequency while a sideslip angle rate system provides a more effective control of the Dutch roll modes and greater flexibility in selecting the optimum damping ratio for the Dutch roll oscillation frequency over the wide airspeed range of the aircraft.

A very desirable turn coordination control characteristic is provided by the present β SCAS system, particularly at the low airspeeds at which a STOL aircraft may operate, in that it significantly reduces the pilot's efforts in providing good turn coordination. Heretofore, a great deal of pilot effort was required to coordinate a commanded turn because of the low directional stability at the low speeds and the resulting large values of sideslip generated during turn entry and turn exit, i.e., as the bank angle is established. With the present system, since sideslip angle directly controls rudder, peak sideslip angles during turn entry and turn exit are reduced substantially from the values they would reach with a conventional yaw rate rudder control. Additionally, since the phasing of the sideslip angle signal is such that positive roll angle produces positive sideslip, the pilot may precisely coordinate the turn by supplying rudder pedal force with a consequent sideslip angle command in the direction he would normally use to coordinate the turn.

If an engine should fail, especially during take-off or landing, the β SCAS of the present invention provides excellent recovery characteristics. Engine failures at low speeds produce immediate and relatively large values of sideslip angle which normally create corresponding large rolling moments due for example to dihedral effect which tends to roll the aircraft into the failed engine thereby aggravating the rolling moment produced by the lost downthrust of the failed engine in a blown flap type STOL aircraft. Also, in this type of aircraft the differential slip stream force on the sides of the fuselage produced by an inboard engine failure may be considerable, thereby aggravating the sideslip tendencies. While the roll SCAS tends to reduce the rolling moment, it is nevertheless initially ineffective and substantial bank angles can occur. However, with the present β yaw SCAS, the rudder correction produced by the sideslip angle signal reduces the sideslip angle significantly thereby reducing the rolling moment and resulting undesired bank angle. For example, in an engine failure situation, with the β SCAS, the bank angle excursion was very significantly reduced. Additionally, immediately after an engine failure without the present β SCAS system, the pilot workload increased immeasurably in endeavoring to minimize the transients associated therewith while with the β SCAS the rapid transients were suppressed automatically and gave the pilot sufficient time to establish a controlled or commanded sideslip through the rudder force signal for compensating for the failed engine.

The sideslip angle command system of the present invention provides excellent aircraft control under cross wind and lateral wind shear conditions and particularly during approaches and landings under such conditions the system permits the pilot to control his flight path with greater precision and reduced workload. This results from both the improved yaw damping characteristics of the system and the fact that the pilot may command a sideslip proportional to rudder force. This latter capability is especially useful in performing a forward slip maneuver during the final approach and just prior to flare. In such a maneuver, the pilot banks the craft into the wind and applies opposite rudder. With the present invention sideslip angle is maintained accurately proportional to rudder pedal force as the pilot adjusts the bank angle. This is particularly useful during wind shears where sideslip angles may have to be progressively changed. The automatic system modifies rudder deflection to maintain the commanded sideslip angle in the presence of all other external disturbances by the pilot maintaining a constant force on the rudder pedals.

It should be pointed out that in some aircraft the pedal force gradient, i.e., degrees β per pound of force, provided by the mechanical rudder-to-actuator connections may not be sufficient under all flight conditions; for example, the very low STOL airspeeds. The pedal force sensor of the SCAS of the present invention is used to make up for this deficiency. Also, in some types of STOL aircraft, the rudder control surface is split, two being used at the slow speed ranges and only one being used at the high speed ranges, this design further limiting the direct mechanical rudder control force/sideslip angle gradient. The electrical rudder force signal of the present invention again is useful is augmenting the mechanical rudder force signal to thereby provide the optimum rudder force/sideslip angle gradient over the entire speed range of the aircraft. Additionally, the invention may advantageously be employed in fly-by-wire systems where no direct mechanical connections are made between the pilot's controllers and the control surfaces. In this case the electrical rudder pedal force signal provides the only manual rudder control term.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. In a yaw axis stability and command augmentation system for aircraft having a manually actuated rudder controller and a primary and secondary rudder actuator means for positioning the rudder to command a substantially steady state side-slip angle attitude of said aircraft proportional to a substantially steady state force on said manually actuated rudder controller, the combination comprising,
    (a) means for supplying a first signal proportional to the side slip angle of the aircraft, including substantially steady state values thereof,
    (b) means for supplying a second signal proportional to the force applied to said manually actuated controller including substantial steady state values thereof,
    (c) summing means responsive to said first and second signals for supplying a control signal in accordance with the difference therebetween, and,
    (d) means supplying said control signal to said secondary actuator for positioning said rudder in accordance therewith, thereby commanding said substantially steady state side-slip angle attitude of said aircraft proportional to said substantially steady state force on said manual controller.

2. A yaw axis SCAS as set forth in claim 1 further including
    (a) means for supplying a third signal proportional to the rate of change the side slip angle of the aircraft, and
    (b) means for supplying said third signal to said summing means for modifying said actuator control signal in accordance therewith to thereby further position said rudder to damp undesired yaw oscillations of said aircraft.

3. The yaw SCAS as set forth in claim 2 wherein the means for supplying said third signal includes (a) means responsive to craft yaw rate for providing a signal in accordance therewith,
(b) means responsive to craft bank angle for providing a signal in accordance therewith, and
(c) means responsive to the algebraic sum of said yaw rate and bank angle signals for supplying said third signal.

4. The yaw SCAS as set forth in claim 3 further including,
(a) means responsive to craft airspeed for providing a signal in accordance therewith, and
(b) means responsive to said airspeed signal for varying the magnitude of said bank angle signal in accordance therewith.

5. The yaw SCAS as set forth in claim 1 further comprising,
(a) means responsive to craft airspeed for providing a signal in accordance therewith, and
(b) means responsive to said airspeed signal for varying the magnitude of said actuator control signal in accordance therewith.

6. The yaw SCAS as set forth in claim 1 wherein the means for supplying to said signal includes low pass filter means having a time constant such as to suppress spurious high frequency rudder controller force signals.

7. The yaw SCAS as set forth in claim 1 further including means responsive to craft airspeed for providing a signal in accordance therewith and wherein the means responsive to said second signal includes means responsive to said airspeed signal for varying the magnitude of said second signal in accordance therewith.

8. The yaw SCAS as set forth in claim 1 wherein the means for supplying said first signal includes low pass filter means having a time constant such as to suppress spurious high frequency sideslip angle signals.

* * * * *